(12) United States Patent
Clever et al.

(10) Patent No.: US 9,091,187 B2
(45) Date of Patent: Jul. 28, 2015

(54) STATIONARY HYDRAULIC LASH ADJUSTER AND ROLLER FINGER FOLLOWER ASSEMBLY CLIP, AND METHOD THEREOF

(71) Applicant: GM GLOBAL TECHNOLOGY OPERATIONS LLC, Detroit, MI (US)

(72) Inventors: Glenn E. Clever, Washington, MI (US); Charles K. Buehler, Lansing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 13/757,994

(22) Filed: Feb. 4, 2013

(65) Prior Publication Data

US 2014/0216378 A1   Aug. 7, 2014

(51) Int. Cl.
  *F01L 1/18*   (2006.01)
  *F01L 1/24*   (2006.01)
  *B23P 11/00*  (2006.01)

(52) U.S. Cl.
  CPC ............... *F01L 1/2416* (2013.01); *B23P 11/00* (2013.01); *Y10T 29/49959* (2015.01)

(58) Field of Classification Search
  CPC ... F01L 1/2416; Y10T 29/49959; B23P 11/00
  USPC .......... 123/90.16, 90.41, 90.43, 90.45–90.46, 123/90.52–90.59, 90.44
  See application file for complete search history.

(56) References Cited

U.S. PATENT DOCUMENTS

| | | | |
|---|---|---|---|
| 2,572,557 A * | 10/1951 | Butler ............................ | 508/478 |
| 3,805,753 A * | 4/1974 | Bergmann et al. ......... | 123/90.36 |
| 4,369,740 A * | 1/1983 | Seidl .......................... | 123/90.45 |
| 5,775,280 A | 7/1998 | Schmidt et al. | |
| 6,047,675 A * | 4/2000 | Kunz .......................... | 123/90.41 |
| 6,138,626 A | 10/2000 | Speil | |
| 7,146,950 B2 * | 12/2006 | Moeck et al. .............. | 123/90.44 |
| 7,350,490 B2 * | 4/2008 | Mock et al. ................ | 123/90.39 |
| 7,721,695 B2 * | 5/2010 | Moeck et al. .............. | 123/90.39 |
| 2001/0035144 A1 * | 11/2001 | Burns ........................ | 123/90.39 |
| 2006/0025680 A1 * | 2/2006 | Jeune-Iomme et al. ...... | 600/425 |
| 2011/0017160 A1 * | 1/2011 | Kishi et al. ................. | 123/90.45 |
| 2012/0037103 A1 * | 2/2012 | Schneider et al. ........... | 123/90.1 |

FOREIGN PATENT DOCUMENTS

WO   WO 2010094601 A1 *   8/2010

OTHER PUBLICATIONS

Chemicalland21.com—Polyethyleneglycol Monostearate, last updated 2010.*

* cited by examiner

*Primary Examiner* — Ching Chang
(74) *Attorney, Agent, or Firm* — Quinn Law Group, PLLC

(57) ABSTRACT

An assembly clip for holding together a stationary hydraulic lash adjuster (SHLA) and a roller finger follower (RFF) in a valve train of an internal combustion engine (ICE) is provided. The SHLA has a pivot, and the RFF has a pivot cap configured to fit around the pivot. The assembly clip includes a first attachment section and a second attachment section configured to engage with the pivot cap and pivot, respectively, to attach the assembly clip to the RFF and SHLA, respectively. When assembled, the pivot and the pivot end are substantially located between the first attachment section and the second attachment section, the pivot cap covering at least a portion of the pivot. The assembly clip is made of an oil soluble material such that it may dissolve and break away after the valve train is assembled into the ICE, and the assembly clip no longer serves a function.

10 Claims, 2 Drawing Sheets

US 9,091,187 B2

STATIONARY HYDRAULIC LASH ADJUSTER AND ROLLER FINGER FOLLOWER ASSEMBLY CLIP, AND METHOD THEREOF

TECHNICAL FIELD

The present invention relates to an assembly clip for holding together a stationary hydraulic lash adjuster (SHLA) and a roller finger follower (RFF) for a valve train assembly of an engine of a vehicle, and a method thereof.

BACKGROUND

An internal combustion engine (ICE) of a vehicle generally includes a valve train to control the operation of the valves in the ICE. The valve train may be in an overhead camshaft configuration in which the camshaft of the ICE is placed above the pistons and combustion chamber to drive the valves. In such a configuration, the ICE may include a stationary hydraulic lash adjuster (SHLA) located between the camshaft and the valve for maintaining zero valve clearance. The SHLA is intermittently filled with engine oil, and may be operated by a roller finger follower (RFF). The RFF engages with a cam lobe to operate the SHLA and to raise and lower the valves.

The camshafts are typically assembled into the valve train at one location, and subsequently transported to another location to be assembled into the ICE. As such, the potential for dislodging the RFF during assembly of the valve train and transport is high. To alleviate this risk, the RFF is clipped to the SHLA with a substantial metal clip. After the ICE is assembled, the clip no longer serves a purpose.

SUMMARY

An assembly clip for holding together a stationary hydraulic lash adjuster (SHLA) and a roller finger follower (RFF) is provided. The SHLA generally includes a pivot, and the RFF generally includes a pivot cap configured to fit around at least a portion of the pivot. The assembly clip includes a first attachment section and a second attachment section. The first attachment section is configured to engage with the pivot cap of the RFF such that the assembly clip is attachable to the RFF. Similarly, the second attachment section is configured to engage with the pivot of the SHLA such that the assembly clip is attachable to the SHLA.

The first attachment section may have a first opening configured to fit around an outer portion of the pivot cap of the RFF such that the assembly clip may securely rest on the pivot cap. The second attachment section may have a second opening and a ledge around the second opening. The second opening may be configured to receive the pivot of the SHLA, and the ledge may be configured such that the pivot rests on the ledge after being inserted through the second opening.

The assembly clip is made of an oil soluble material, which may be a polyethylene, polystyrene, or a combination thereof.

An assembly including a RFF and a SHLA held together by an assembly clip is also provided. Again, the SHLA generally includes a pivot, and the RFF generally includes a pivot cap configured to fit around the pivot. The assembly clip is as described above. The pivot cap and pivot are positioned substantially between the first attachment section and the second attachment section. In addition, the pivot cap covers at least a portion of the pivot.

A method for holding together the SHLA and the RFF with the assembly clip to form the assembly described above is further provided. The method includes first attaching the assembly clip to the RFF via the first attachment section such that at least a portion of the pivot cap is positioned between the first attachment section and the second attachment section. Where the first attachment section has a first opening, as described above, this may include positioning the assembly clip such that the first opening receives a portion of the pivot cap, and the assembly clip securely rests on the pivot cap.

The method then includes attaching the assembly clip to the SHLA via the second attachment section such that the pivot end is likewise positioned between the first attachment section and the second attachment section, and at least a portion of the pivot is covered by the pivot cap. Where the second attachment section has a second opening and a ledge around the second opening, as described above, this may include inserting the pivot of the SHLA through the second opening such that the pivot head securely rests on the ledge, and at least a portion of the pivot head is covered by the pivot cap.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figures 1A, 1B:
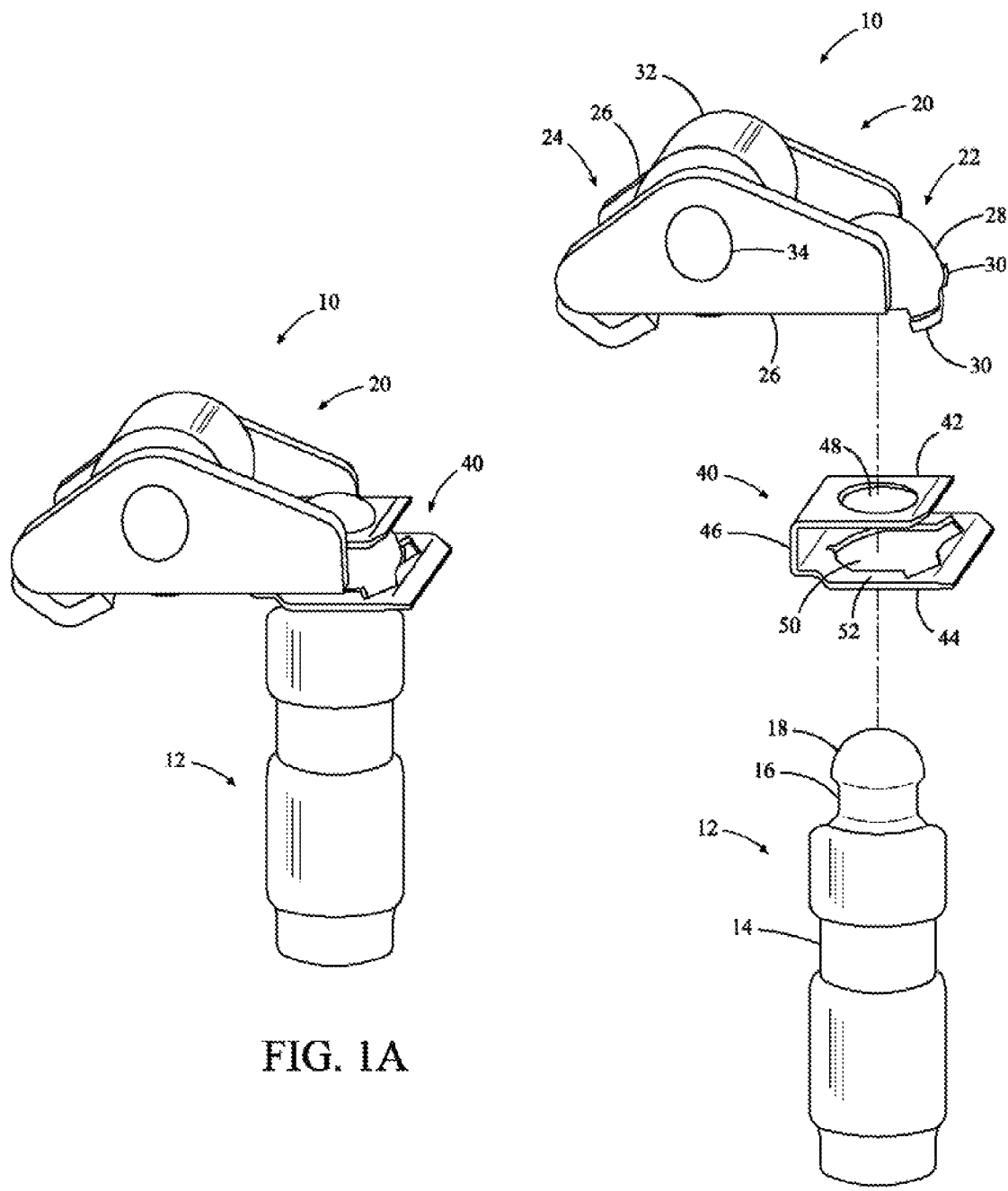
FIG. 1A is a schematic, perspective view of an assembly of a stationary hydraulic lash adjuster (SHLA) and a roller finger follower (RFF) held together by an assembly clip.
FIG. 1B is a schematic, exploded perspective view of the assembly of FIG. 1A in an unassembled state.

Referring to the drawings, wherein like reference numbers correspond to like or similar components wherever possible throughout the several figures, an assembly 10 of a stationary hydraulic lash adjuster (SHLA) 12 and a roller finger follower (RFF) 20 held together by an assembly clip 40 is shown in FIGS. 1A and 1B. The assembly 10 is shown in an assembled state in FIG. 1A, and in an unassembled state in FIG. 1B. The SHLA 12 and RFF 20 are generally assembled together in a valve train (not shown) of an internal combustion engine (not shown). The SHLA 12 and the RFF 20 are not secured to each other until the valve train is incorporated onto the internal combustion engine. Until then, the assembly clip 40 is utilized to hold the SHLA 12 and the RFF 20 together such that they will not become disassembled, such as during transport.

The SHLA 12 generally includes a body 14 and a plunger 16. The plunger 16 is slidable within the body 14. At the exposed end of the plunger 16, there is a pivot 18 at which the SHLA 12 and the RFF 20 are engaged with each other. The pivot 18 fits within a pivot cap 28 of the RFF 20, described hereinafter, thereby allowing the RFF 20 to sit on the SHLA 12, and to allow the RFF 20 to move with multiple degrees of freedom.

The RFF 20 generally includes a lash adjuster end 22, a valve stem end 24, and two side walls 26 connecting the two ends 22 and 24. At the valve stem end 24, the RFF 20 is configured to engage with a valve stem (not shown) of a valve (not shown) to raise and lower the valve. At the lash adjuster end 22, the RFF 20 is configured to engage with the SHLA 12, as explained above. The RFF 20 includes the pivot cap 28, mentioned above, at the lash adjuster end 22. The pivot cap 28 is configured to fit around at least a portion of the pivot 18 of the SHLA 12.

The RFF 20 also includes a cam follower 32 located between the side walls 26, and held in place by an axle 34. The cam follower 32 is configured to engage with cam lobes (not shown) such that the valve may be raised and lowered at defined intervals, as explained above.

Figure 2:
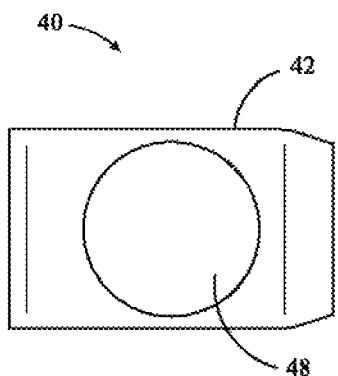
FIG. 2 is a schematic, plan view of the assembly clip of FIGS. 1A and 1B illustrating a first attachment section of the assembly clip.
Figure 3:
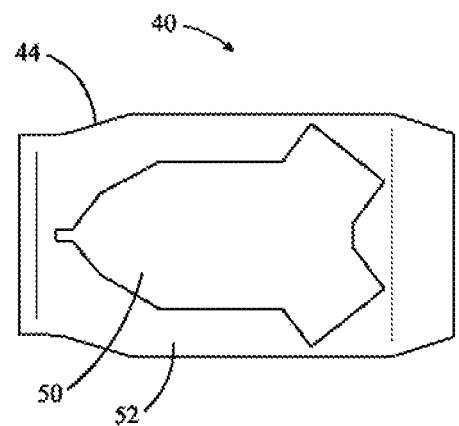
FIG. 3 is a schematic, bottom view of the assembly clip of FIGS. 1A and 1B illustrating a second attachment section of the assembly clip.

The assembly clip 40 includes a first attachment section 42 and a second attachment section 44, as further depicted in FIGS. 2 and 3, respectively. The first attachment section 42 and the second attachment section 44 may be connected by a spine 46.

Referring now to FIG. 2, the first attachment section 42 may include a first opening 48 configured to fit around at least an outer portion of the pivot cap 28 of the RFF 20. As such, a portion of the pivot cap 28 may protrude through the first opening 48, thereby allowing the assembly clip 40 to securely rest on the pivot cap 28, and the remaining portion of the pivot cap 28 may be positioned between the first attachment section 42 and the second attachment section 44, as seen in FIG. 1A. While the first opening 48 is shown as being substantially circular in shape, it should be appreciated that it may be any shape that may allow the assembly clip 40 to securely rest on the cap 28.

Referring now to FIG. 3, the second attachment section 44 includes a second opening 50 and a ledge 52 around the second opening 50. The second opening 50 is configured to receive the pivot 18 of the SHLA 12 such that it may be positioned between the first attachment section 42 and the second attachment section 44 after being inserted through the second opening 50. The widest portion of the second opening 50 may be sized to match the widest portion of the pivot 18 with a negative tolerance such that a certain amount of force is required to push the pivot 18 through the second opening 50 and snap it in place. The pivot 18 may then securely rest on the ledge 52.

Referring back to FIGS. 1A and 1B, the RFF 20 may also include legs 30. The legs 30 may be configured to latch on to the ledge 52 of the SHLA 12, as depicted in FIG. 1A, to further secure the assembly clip to the RFF 20.

The assembly clip 40 generally is attached to the RFF 20 prior to the SHLA 12, as described in method 100 below. This allows the pivot 18 to be inserted directly within the pivot cap 28 when being attached to the assembly clip 40.

The assembly clip 40 is made of a material that is oil soluble. When the internal combustion engine is fully assembled, the assembly clip 40 no longer serves a function, as the risk of the SHLA 12 and the RFF 20 being dismantled is no longer a concern. When the internal combustion engine is in operation, oil is distributed throughout to lubricate various components of the internal combustion engine, including the SHLA and the RFF. As such, the oil comes into contact with the assembly clip 40 as well.

The oil soluble material may be, but is not limited to, a polyethylene (such as Polywax), polystyrene (such as acrylonitrile ethylene styrene (AES)), a combination thereof, or the like. These materials are generally soluble in aromatics such as benzene, xylene, and toluene, which may be present in oil. The temperature generally needs to be above room temperature, and as the temperature increases, the greater the solubility of the material. As such, when the oil contacts the assembly clip 40, as described above, it will steadily dissolve the material over time until the assembly clip 40 ultimately breaks off of or deforms and falls off of the SHLA 12 and the RFF 20. The remnant pieces of the assembly ring 40 may then be collected in an oil pan (not shown) and/or oil filter (not shown) of the internal combustion engine.

Figure 4:
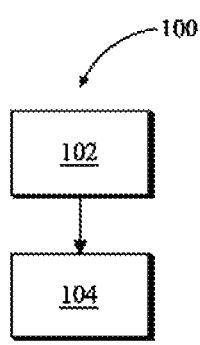
FIG. 4 is a schematic flow diagram illustrating an exemplary method of assembling the assembly of FIG. 1.

Referring now to FIG. 4, a method 100 for assembling the SHLA 12, the RFF 20, and the assembly clip 40 to form the assembly 10, is shown. Method 100 begins at step 102 in which the assembly clip 40 is attached to the RFF 20 via the first attachment section 42. This may be accomplished by positioning the assembly clip 40 such that the first opening 48 receives a portion of the pivot cap 28, which allows the assembly clip 40 to securely rest on the pivot cap 28. As explained above, the remaining portion of the pivot cap 28 will be positioned between the first attachment section 42 and the second attachment section 44.

After step 102, method 100 proceeds to step 104. At step 104, the SHLA 12 is attached to the second attachment section 44 of the assembly clip 40. This may be accomplished by inserting the pivot 18 of the SHLA 12 through the second opening 50 of the second attachment section 44 until the pivot 18 snaps into place. As explained above, the second opening 50 may be sized with minimal negative tolerances such that a certain amount of force is required to push the pivot 18 through the second opening 50. After the pivot 18 is snapped in place, it then securely rests on the ledge 52. At least a portion of the pivot 18 is covered by the pivot cap 28.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An assembly comprising:
a stationary hydraulic lash adjusted (SHLA) having a pivot;
a roller finger follower (RFF) having a pivot cap configured to fit around at least a portion of the pivot of the SHLA, wherein the RFF includes a plurality of legs protruding from the pivot cap toward the SHLA; and
an assembly clip configured to hold together the SHLA and the RFF, the assembly clip having:
a first attachment portion configured to engage with the pivot cap of the RFF such that the assembly clip is attachable to the RFF; and
a second attachment portion configured to engage with the pivot of the SHLA such that the assembly clip is attachable to the SHLA, wherein the second attachment portion includes a ledge, and the plurality of legs are latched onto the ledge;
wherein the pivot cap and the pivot are positioned at least partially between the first attachment portion and the second attachment portion, the pivot cap covering at least a portion of the pivot; and
wherein the assembly clip is made of an oil soluble material.

2. The assembly of claim 1 wherein the oil soluble material is a polyethylene.

3. The assembly of claim 1 wherein the oil soluble material is a polystyrene.

4. The assembly of claim 1 wherein the first attachment portion of the assembly clip comprises a first opening configured to fit around an outer portion of the pivot cap of the RFF.

5. The assembly of claim 4 wherein the second attachment portion of the assembly clip comprises a second opening and a ledge around the second opening, the second opening being configured to receive the pivot of the SHLA, and the ledge being configured such that the pivot rests on the ledge after being inserted through the second opening.

6. The assembly of claim 5, wherein a widest portion of the second opening is sized to match a widest portion of the pivot with a negative tolerance such that a force is required to push the pivot through the second opening and snap the pivot in place.

7. The assembly of claim 1 wherein the assembly clip further comprises a spine connecting the first attachment portion and the second attachment portion.

8. A method for holding together a stationary hydraulic lash adjuster (SHLA) and a roller finger follower (RFF) with an assembly clip, the SHLA having a pivot, the RFF having a pivot cap configured to fit around the pivot and a plurality of legs protruding from the pivot cap, the assembly clip having a first attachment portion and a second attachment portion, the first attachment portion having a first opening, the second attachment portion having a second opening, and the second attachment portion including a ledge around the second opening, the method comprising:
  attaching the assembly clip to the RFF via the first attachment portion such that at least a portion of the pivot cap is positioned between the first attachment portion and the second attachment portion and the plurality of legs extend through the second opening and latch onto the ledge;
  attaching the assembly clip to the SHLA via the second attachment portion such that the pivot is positioned between the first attachment portion and the second attachment portion, and at least a portion of the pivot being covered by the pivot cap;
  wherein the assembly clip is made of an oil soluble material.

9. The method of claim 8 wherein the first opening is configured to fit around an outer portion of the pivot cap of the RFF, and the attaching of the assembly clip to the RFF comprises positioning the assembly clip such that the first opening receives a portion of the pivot cap, and the assembly clip securely rests on the pivot cap.

10. The method of claim 9 wherein the attaching of the assembly clip to the SHLA comprises inserting the pivot of the SHLA through the second opening such that the pivot securely rests on the ledge, and at least a portion of the pivot is covered by the pivot cap of the RFF.

* * * * *